(12) United States Patent
Bachman

(10) Patent No.: US 7,300,073 B2
(45) Date of Patent: Nov. 27, 2007

(54) FUEL TANK TRAILER

(75) Inventor: Todd Bachman, Parker, CO (US)

(73) Assignee: Western Environmental, LLC, Aurora, CO (US)

( * ) Notice: Subject to any disclaimer, the term of this patent is extended or adjusted under 35 U.S.C. 154(b) by 160 days.

(21) Appl. No.: 10/979,358

(22) Filed: Nov. 2, 2004

(65) Prior Publication Data

US 2006/0091667 A1 May 4, 2006

(51) Int. Cl.
B60P 3/22 (2006.01)
B60P 3/24 (2006.01)
(52) U.S. Cl. .................. 280/839; 280/837; 137/590
(58) Field of Classification Search ............ 280/839, 280/837; 137/590
See application file for complete search history.

(56) References Cited

U.S. PATENT DOCUMENTS

| 2,022,324 | A | * | 11/1935 | Schock | .................. 280/837 |
| 2,340,628 | A | * | 2/1944 | Theriault | ................ 280/837 |
| 2,421,765 | A | | 6/1947 | Taylor | |
| 2,567,164 | A | | 9/1951 | Brehany et al. | |
| 3,172,566 | A | | 3/1965 | Tomlinson et al. | |
| 3,263,865 | A | | 8/1966 | Kachnik | |
| 3,352,461 | A | | 11/1967 | Dascanio | |
| 3,604,719 | A | | 9/1971 | Kerr | |
| 4,213,728 | A | | 7/1980 | McKenzie | |
| 4,272,089 | A | * | 6/1981 | Watkins, Jr. | ................ 280/837 |
| 4,394,027 | A | * | 7/1983 | Watkins, Jr. | ................ 280/837 |
| 4,395,052 | A | * | 7/1983 | Rash | ........................ 280/837 |
| 4,482,017 | A | | 11/1984 | Morris | |
| 4,502,610 | A | | 3/1985 | Todd | |
| 5,071,166 | A | * | 12/1991 | Marino | ...................... 280/830 |
| 5,121,796 | A | | 6/1992 | Wigington, Sr. | |
| 5,232,246 | A | | 8/1993 | Page | |
| 5,419,400 | A | | 5/1995 | Wigington, Sr. | |
| 6,715,195 | B2 | * | 4/2004 | Erickson | ..................... 29/434 |
| 6,797,168 | B1 | * | 9/2004 | Knight | ................ 210/497.01 |
| 7,070,692 | B2 | | 7/2006 | Knight | |
| 2005/0017899 | A1 | | 1/2005 | Cervinka et al. | |

OTHER PUBLICATIONS

PIG® Material Safety Data Sheet, date unknown, 2 pages. No Date Available.
PIG® Oil-Only Mat Absorbents, date unknown, 1 page. No Date Available.

* cited by examiner

Primary Examiner—Lesley D. Morris
Assistant Examiner—Marlon Arce-Diaz
(74) Attorney, Agent, or Firm—Dorsey & Whitney LLP

(57) ABSTRACT

A fuel tank trailer has a fuel tank supported on the bed of the trailer, and a secondary containment wall surrounding the fuel tank to provide an open secondary containment region. A drain valve controls the flow of fuel and water collecting in the secondary containment region. A fuel separation filter separates the fuel from any water draining from the secondary containment region.

16 Claims, 3 Drawing Sheets

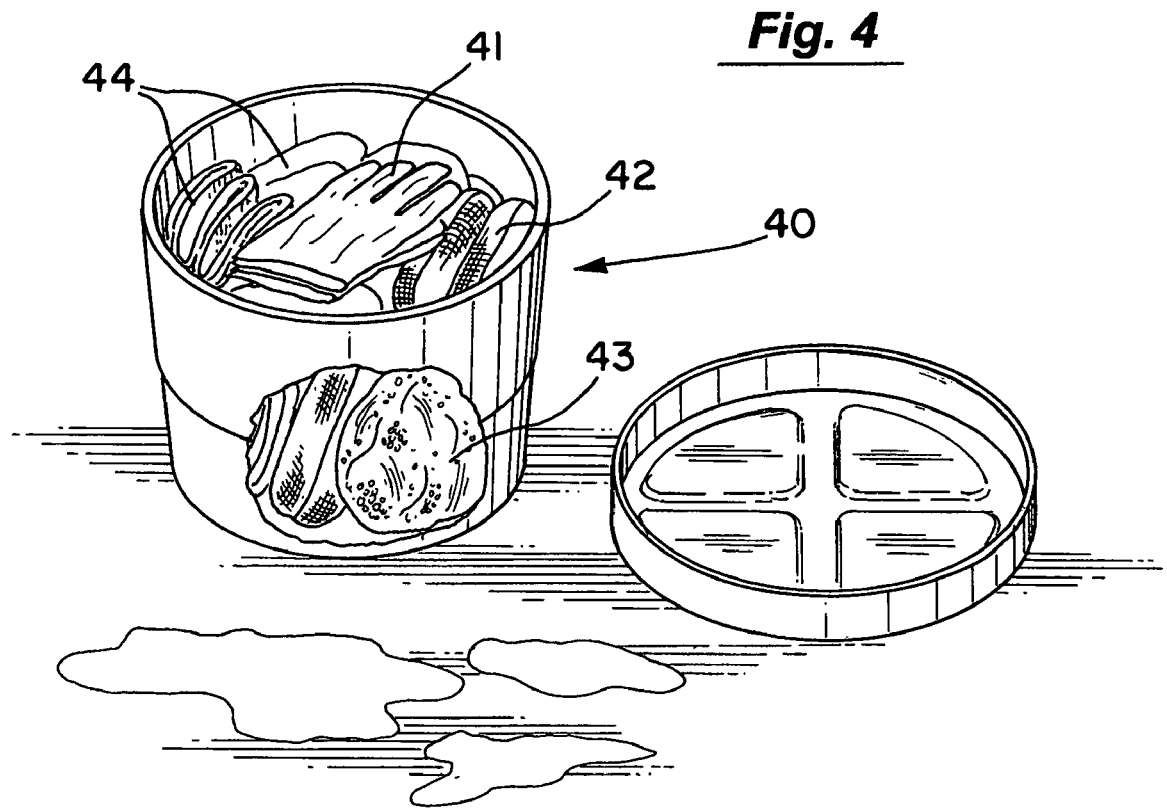

FUEL TANK TRAILER

BACKGROUND OF THE INVENTION

1. Field of the Invention

The present invention relates generally to the field of fuel tank trailers. More specifically, the present invention discloses a fuel tank trail with a secondary containment wall and filter for separating fuel from water.

2. Statement of the Problem

Fuel tank trailers have been widely used for many years. Some fuel tank trailers are little more than a fuel tank with wheels and a trailer hitch, but this provides no means for secondary containment of fuel leaking or spilling from the tank. One approach to this problem has been to use a double-walled tank. The void between the tank walls provides a secondary containment region for any fuel leaking from the inner tank. However, double-walled tanks are significantly more expensive to construct. In addition, it can be difficult to detect leakage from the inner tank, particularly at the initial stages of a leakage problem if only a small amount of fuel is escaping from the inner tank. Some double-walled tanks attempt to address this problem by installing a sight glass or access port into the secondary containment region between the tank walls. Nonetheless, it is advantageous to be able to visually inspect as much of the exterior surface of the fuel tank as possible so that leakage problems can be detected as soon as possible.

Secondary containment walls or berms have also been widely used for many years, particular for stationary fuel tanks. For example, large fuel tanks in tank farms are typically surrounded by an earthen berm for secondary containment. Many smaller stationary fuel tanks and other types of tanks for containing flammable or hazardous liquids are also equipped with a secondary containment wall or berm.

One problem associated with an open secondary containment region is that rain water, dew, and melting snow can also accumulate in the secondary containment region and result in a mixture of fuel and water. This mixture presents a fire hazard and an environmental risk, and so cannot be readily disposed of without treatment. This poses a significant problem and has been viewed as a significant limitation of open secondary containment systems. Therefore, a need exists for a open secondary containment system that provides a means for addressing the problem of fuel and water accumulating in the secondary containment region.

The prior art in this field includes the following:

| Inventor | Patent No. | Issue Date |
|---|---|---|
| Erickson | 6,715,195 | Apr. 6, 2004 |
| Page | 5,232,246 | Aug. 3, 1993 |
| Marino | 5,071,166 | Dec. 10, 1991 |
| Morris | 4,482,017 | Nov. 13, 1984 |
| Kerr | 3,604,719 | Sep. 14, 1971 |
| Dascanio | 3,352,461 | Nov. 14, 1967 |
| Kachnik | 3,263,865 | Aug. 2, 1966 |
| Brehany et al. | 2,567,164 | Sep. 11, 1951 |
| Taylor | 2,421,765 | Jun. 10, 1947 |

Marino discloses a transportable holding tank that has an inner tank and a surrounding rigid enclosure for containment. Marino's tank assembly has small wheels at one end of the support frame.

Brehany et al. disclose a portable double-walled tank.

Kerr discloses a towable liquid storage tank that is held by a tub-like saddle.

Erickson discloses a towable tank for mixing and delivering material, such as asphalt. An agitation member is used for mixing within the tank.

Taylor discloses a tank with multiple compartments. The remaining references are only of passing interest.

Solution to the Problem.

None of the prior art references discussed above show a fuel tank trailer having an open secondary containment region and a fuel separation filter to separate water from any fuel collecting in the secondary containment region. This approach combines the advantages of an open secondary containment system with a convenient of means for treating the fuel/water mixture.

SUMMARY OF THE INVENTION

This invention provides a fuel tank trailer having a fuel tank supported on the bed of the trailer, and a secondary containment wall surrounding the fuel tank to provide an open secondary containment region. A drain valve controls the flow of fuel and water collecting in the secondary containment region. A fuel separation filter separates the fuel from any water draining from the secondary containment region.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 4 is a perspective view of the spill kit 40.

DETAILED DESCRIPTION OF THE INVENTION

Figure 1:
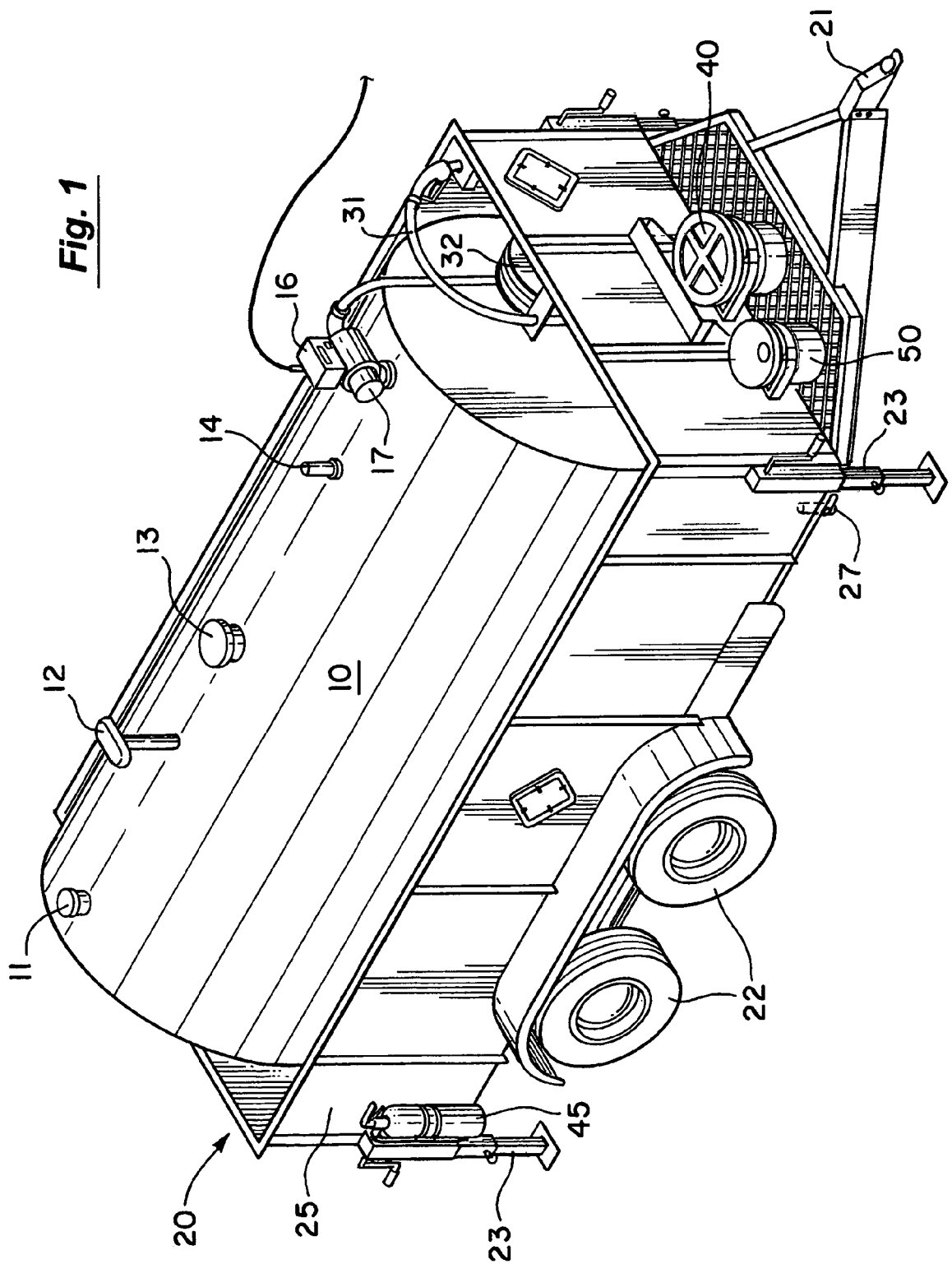
FIG. 1 is a front perspective view of the fuel tank trailer.

Turning to FIG. 1, a front perspective view is provided showing an embodiment of the present fuel tank trailer. The fuel tank 10 is supported on the bed of the trailer 20 and can be of virtually any conventional construction. For example, the tank 10 can be either single-walled or double-walled. In the preferred embodiment, the fuel tank 10 includes a filler port 11 for filling the tank 10, as well as an atmospheric vent 12 and emergency vent 13. A fill level sight gauge 14 provides an externally visible indication of the fuel level in the tank 10. The interior of the tank 10 can also be accessed through an empty port 15, shown in FIG. 2, to remove all of the fuel from the tank 10 in preparation for cleaning and maintenance. In normal operation, fuel can be withdrawn from the tank 10 by means of a pump 17. Optionally, the amount of fuel dispensed can be measured by a meter 16. Fuel can be delivered via a hose 31 with a standard nozzle. The hose 31 can stored in a hose reel 32 mounted to the trailer 20 when not in use.

Figure 2:
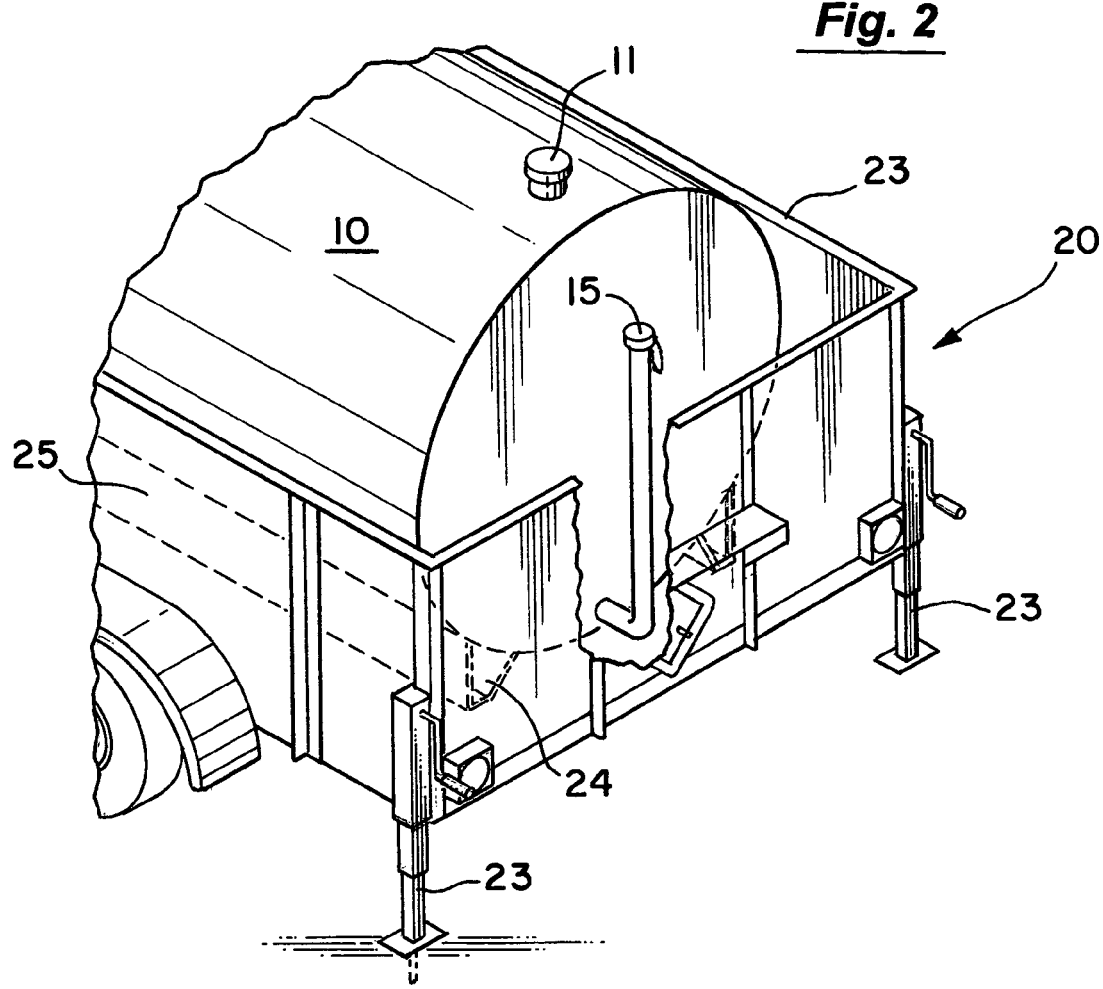
FIG. 2 is a rear perspective view of a portion of the fuel tank trailer.

The trailer 20 is mounted on wheels 22 and can be towed by means of its trailer hitch 21. A number of stanchions 23 can be lowered from the trailer to support the bed of the trailer in a generally horizontal orientation when the trailer 20 is not being towed. Optionally, a number of tank supports 24 can be used to cradle and support the tank 10 on the bed of the trailer 20, as depicted in FIG. 2. This may be especially necessary if the tank 10 has a rounded or curved vertical cross-section.

A secondary containment wall 25 surrounds the tank 10 on the bed of the trailer 20. The enclosed area between the tank 10 and the secondary containment wall 25 defines a secondary containment region surrounding the fuel tank 10 to hold any fuel leaking from the fuel tank 10. The secondary containment region is open for visual inspection to determine whether fuel is leaking from the fuel tank 10. For example, the secondary containment wall 25 can extend around the perimeter of the bed of the trailer 20 as illustrated in FIGS. 1 and 2. The height of the secondary containment wall 25 should be great enough so that the secondary containment region can be hold the entire contents of the tank 10, if necessary. However, it should be sufficiently low to allow convenient access to the tank 10 and permit visual inspection of the secondary containment region and the tank 10. Optionally, the exposed surfaces of the secondary containment region (i.e., the trailer bed and interior surfaces of the secondary containment walls 25) can be treated with a polymeric coating to reduce rust and corrosion.

Figure 3:
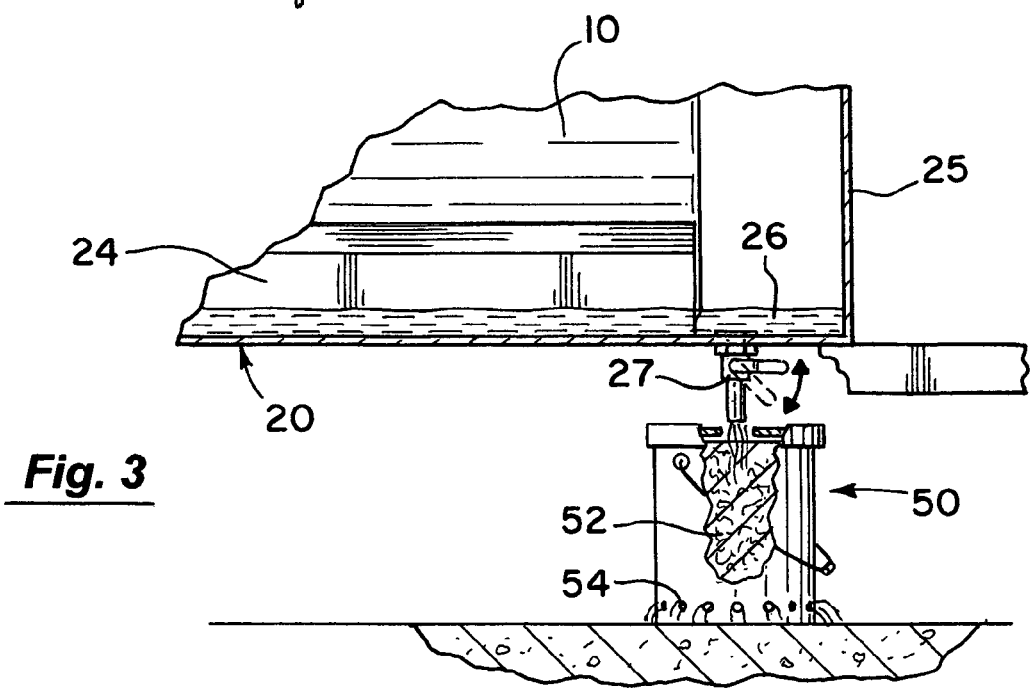
FIG. 3 is a detail vertical cross-sectional view of a portion of the trailer 20 adjacent to the drain valve 27 including the filter bucket 50.

A drain valve 27 in the bed of the trailer 20 controls drainage of fuel/water 26 from the secondary containment region, as shown in FIG. 3. If only water has collected in the secondary containment region, this can be allowed to drain onto the ground without treatment simply by opening the drain valve 27. On the other hand, if visual inspection reveals that fuel has leaked from the tank 10 and collected in the secondary containment region, a fuel separation filter 50 can be placed beneath the drain valve 27, as illustrated in FIG. 3, to separate the water from the fuel in the mixture draining through the valve 27.

In the embodiment shown in FIG. 3, the fuel separation filter 50 is a bucket containing a filter material 52 that selectively absorbs oil, gasoline and other hydrocarbon-based fuels, while not absorbing water. For example, "Oil-Only PIG" absorbent material marketed by New Pig Corporation of Tipton, Pa., can be used as the filter material 52. This material contains a cellulose pulp core with an outer layer of polypropylene. Small holes 54 in the bottom of the bucket 50 allow water to escape. Thus, any water in the mixture draining into the bucket percolates through the filter material 52 and flows out through the holes 54. In contrast, any fuel in the mixture will be absorbed by the filter material 54. After filtering has been completed, the filter material 52 and any trapped fuel can be removed for incineration, disposal, or further treatment.

Optionally, the fuel tank trailer can also be equipped with a spill clean-up kit 40 to remove small fuel spills. An example of a spill clean-up kit 40 is shown in FIG. 4. This kit 40 includes rubber gloves 41, absorbent pads 42, clay 43, and other absorbent materials 44. A fire extinguisher 45 can also be mounted to the trailer 20.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A fuel tank trailer comprising:
a fuel tank;
a trailer having a bed supporting the fuel tank;
a secondary containment wall surrounding the fuel tank on the trailer providing an open secondary containment region for collection of any fuel leaking from the fuel tank;
a drain valve controlling the flow of fuel and any water collecting in the secondary containment region;
a fuel separation filter operatively associated with the drain valve for separating the fuel from any water draining through the drain valve from the secondary containment region; and
a spill clean-up kit containing materials for cleaning up fuel spills and selectively attachable to the trailer.

2. The fuel tank trailer of claim 1 wherein the secondary containment wall extends around the perimeter of the bed of the trailer.

3. A fuel tank trailer comprising:
a fuel tank;
a trailer having a bed supporting the fuel tank;
a secondary containment wall surrounding the fuel tank on the trailer providing an open secondary containment region for collection of any fuel leaking from the fuel tank;
a drain valve controlling the flow of fuel and any water collecting in the secondary containment region;
a fuel separation filter operatively associated with the drain valve for separating the fuel from any water draining through the drain valve from the secondary containment region; and
the drain valve is in the bed of the trailer.

4. A fuel tank trailer of comprising:
a fuel tank;
a trailer having a bed supporting the fuel tank;
a secondary containment wall surrounding the fuel tank on the trailer providing an open secondary containment region for collection of any fuel leaking from the fuel tank;
a drain valve controlling the flow of fuel and any water collecting in the secondary containment region;
a fuel separation filter operatively associated with the drain valve for separating the fuel from any water draining through the drain valve from the secondary containment region; and
the secondary containment region is open for visual inspection to detect leakage of fuel from the fuel tank.

5. The fuel tank trailer of claim 1 wherein the fuel separation filter comprises a bucket containing filter material retaining the fuel, and wherein the bucket has holes allowing drainage of water from the bucket.

6. The fuel tank trailer of claim 5 wherein the filter material comprises a cellulose pulp core and an outer layer of polypropylene.

7. The fuel tank trailer of claim 1 wherein the trailer further comprises wheels.

8. A fuel tank trailer comprising:
a fuel tank;
a trailer having a bed supporting the fuel tank;
a secondary containment wall surrounding the fuel tank on the trailer providing an open secondary containment region for collection of any fuel leaking from the fuel tank;
a drain valve controlling the flow of fuel and any water collecting in the secondary containment region;
a fuel separation filter operatively associated with the drain valve for separating the fuel from any water draining through the drain valve from the secondary containment region; and a polymeric coating on the surfaces of the secondary containment region.

9. A fuel tank trailer comprising:
a fuel tank;
a trailer having;
(a) wheels;
(b) a bed supporting the fuel tank;
(c) a secondary containment wall extending around the perimeter of the bed of the trailer defining an secondary containment region surrounding the fuel tank that is open for visual inspection to detect leakage of fuel from the fuel tank; and
(d) a drain valve controlling the flow of fuel and any water collecting in the secondary containment region; and
a fuel separation filter operatively associated with the drain valve for separating the fuel from any water draining through the drain valve from the secondary containment region.

10. The fuel tank trailer of claim 9 wherein the drain valve is in the bed of the trailer.

11. The fuel tank trailer of claim 9 wherein the fuel separation filter comprises a bucket containing filter material retaining the fuel, and wherein the bucket has holes allowing drainage of water from the bucket.

12. The fuel tank trailer of claim 11 wherein the filter material comprises a cellulose pulp core and an outer layer of polypropylene.

13. The fuel tank trailer of claim 9 further comprising a polymeric coating on the surfaces of the secondary containment region.

14. A fuel tank trailer comprising:
a fuel tank;
a trailer having;
(a) a bed supporting the fuel tank;
(b) a secondary containment wall surrounding the fuel tank on the trailer providing an open secondary containment region for collection of any fuel leaking from the fuel tank; and
(c) a drain valve controlling the flow of fuel and any water collecting in the secondary containment region;
a fuel separation filter operatively associated with the drain valve for separating the fuel from any water draining through the drain valve from the secondary containment region having:
(a) a bucket with holes allowing water to escape from the bucket; and
(b) filter material within the bucket retaining any fuel; and
a polymeric coating on the surfaces of the secondary containment region.

15. The fuel tank trailer of claim 14 wherein the secondary containment wall extends around the perimeter of the bed of the trailer.

16. The fuel tank trailer of claim 14 wherein the filter material comprises a cellulose pulp core and an outer layer of polypropylene.

* * * * *